United States Patent [19]

Okamoto et al.

[11] Patent Number: 4,480,897
[45] Date of Patent: Nov. 6, 1984

[54] SINGLE-POLARIZATION SINGLE-MODE OPTICAL FIBER

[75] Inventors: Katsunari Okamoto; Toshihito Hosaka; Yutaka Sasaki; Juichi Noda; Takao Edahiro, all of Mito, Japan

[73] Assignee: Nippon Telegraph & Telephone Public Corporation, Tokyo, Japan

[21] Appl. No.: 388,543

[22] Filed: Jun. 15, 1982

[30] Foreign Application Priority Data

Aug. 27, 1981 [JP] Japan ................ 56-133334

[51] Int. Cl.³ .............................................. G02B 5/172
[52] U.S. Cl. ................. 350/96.30; 350/96.33
[58] Field of Search ................ 350/96.29, 96.30, 96.33

[56] References Cited

U.S. PATENT DOCUMENTS

| 4,179,189 | 12/1979 | Kaminow et al. | 350/96.33 |
| 4,307,938 | 12/1981 | Dyott | 350/96.30 |
| 4,415,230 | 11/1983 | Keck | 350/96.33 |

FOREIGN PATENT DOCUMENTS 32390 7/1981 European Pat. Off. ......... 350/96.30

OTHER PUBLICATIONS

Hosaka et al., *Electronics Letters*, vol. 17, No. 15, Jul. 23, 1981, "Low-Loss Single Polarisation . . . ", pp. 530-531.
Hosaka et al., *Electronics Letters*, vol. 17, No. 5, Mar. 5, 1981, "Single Mode Fibres With . . . ", pp. 191-193.
Okoshi et al., *Electronic Letters*, vol. 16, No. 18, Aug. 28, 1980, "Single-Polarisation Single-Mode . . . ", pp. 712-713.
"Bending-Induced Birefringence in Single-Mode Fibers", by R. Ulrich *Optics Ltt.*, vol. 5, No. 6, pp. 273-275, 1980.
"Elliptical Dielectric Waveguides", by C. Yah, *Journal of Applied Physics*, vol. 33, No. 11, pp. 3235-3243, 1962.
"Single-Polarization Optical Fiber Having a Symmetrical Refractive Index Grooves", by Hosaka et al., pp. 43-48, 1981.

*Primary Examiner*—William L. Sikes
*Assistant Examiner*—Frank González
*Attorney, Agent, or Firm*—Blakely, Sokoloff, Taylor & Zafman

[57] ABSTRACT

A single-polarization single mode optical fiber of the type comprising an elliptical core, a pair of stress applying parts on both sides of the minor radius of the elliptical core for applying asymmetrical stress thereto and a clad embedding therein the core and the stress applying parts, the stress applying parts being made of $B_2O_3$ wherein a relative refractive index difference $\Delta$ between the core and the clad satisfies a relation $0.004 \leq \Delta \leq 0.05$, an ellipticity $\epsilon$ satisfies a relation $0.01 \leq \epsilon \leq 0.9$, the $B_2O_3$ has a molar concentration of 1 to 25 mole %, ratio of thickness of the stress applying parts and the core is 5 to 15, a modal birefringence B expressed by an equation $B=(\beta_x-\beta_y)/k$ satisfies a relation $B=1\times10^{-6}$ where $(\beta_x-\beta_y)$ represents a propagation constant difference between $HE_{11}{}^x$ and $HE_{11}{}^y$ modes, and k a wave number in vacuum, whereby a polarization mode dispersion, that is a delay time difference between the $HE_{11}{}^x$ and $HE_{11}{}^y$ modes which are orthogonal with each other is zero.

2 Claims, 20 Drawing Figures

SINGLE-POLARIZATION SINGLE-MODE OPTICAL FIBER

BACKGROUND OF THE INVENTION

This invention relates to a single-polarization single-mode optical fiber utilized in a coherent optical transmission system, optical measurement, a coupling with an integrated circuit, etc.

When the propagation constants of light of $HE_{11}$ mode which is polarized in the directions of two orthogonal major axes of an optical fiber is denoted by $\beta_x$ and $\beta_y$ respectively, the modal birefrigence B is given by $$B = (\beta_x - \beta_y)/k \quad (1)$$

where k is called the wave number of light transmitting through vacuum and expressed by an equation $k = 2\pi/\lambda$ ($\lambda$ represents the wavelength of light in vacuum). It is well known that the modal birefringence B should be larger than about $10^{-6}$ in order to prevent linearly polarized state from being disturbed by such external forces as bending force or pressure when linearly polarized light is incident in the direction of the major axis of an optical fiber (see for example R. Ulrich et al "Bending-induced birefringence in single-mode fibers" Optics Ltt. Vol. 5, No. 6 pp. 273-275, 1981). Consequently, it has been proposed to increase the modal birefringence by providing a noncircular core at the center of a clad (see. C. Yah, "Elliptical dielectric waveguides", Journal of applied Physics. Vol. 33. No. 11, pp. 3235-3243, 1962) or by disposing a pair of second clads on both sides of a central core, the second clads being made of a material having different thermal expansion coefficient as that of the central core and a clad, so as to apply asymmetrical stress upon the central core (see Japanese patent application No. 4587/1981 invented by Miyagi and having a title of the invention "Method of manufacturing an internal stress birefringence single-mode optical fiber").

The modal birefringence B of an optical fiber having a noncircular core is expressed by the following equation $$B = (\beta_{xo} - \beta_{yo})/k + P \cdot (\sigma_x - \sigma_y) \quad (2)$$

where $\beta_{xo}$ and $\beta_{yo}$ represent propagation constants under a no stress condition, $\sigma_x$ and $\sigma_y$ are principal stresses (kg/mm²) in the directions of major axes and P represents a photoelastic coefficient of quartz glass given by $$P = 3.36 \times 10^{-5} \, (mm^2/kg) \quad (3)$$

The first term of equation (2) is called geometrical anistropy $B_g$, while the second term is called stress-induced birefringence $B_s$. Now, suppose that the ellipticity $\epsilon$ of the elliptical optical fiber is given by an equation $$\epsilon = 1 - b/a \quad (4)$$

where a represents a major radius of the ellipse and b a minor radius thereof.

The geometrical anisotropy $B_g$ and the stress induced birefringence $B_s$ of an optical fiber having an ellipticity $\epsilon = 0.4$ and a relative refractive index difference of $\Delta = 0.6\%$ are calculated as $B_g = 1.2 \times 10^{-5}$ and $B_s = 3.1 \times 10^{-5}$, whereas the modal birefringence is shown by $$B = B_g + B_s = 4.3 \times 10^{-5} \quad (5)$$

The delay times per unit length of orthogonal polarization modes of a single-polarization optical fiber are $$\tau_x = \frac{1}{c} \frac{dBx}{dk} \quad (6)$$

$$\tau_y = \frac{1}{c} \frac{dBy}{dk} \quad (7)$$

Under these conditions, the difference D between the delay times (polarization mode dispersion) per unit length of the two polarization modes is given by the following equation $$D = \tau_x - \tau_y = \frac{1}{c} \left( \frac{dBx}{dk} - \frac{dBy}{dk} \right) \quad (8)$$

where c represents the velocity of light in vacuum. From equations (1) and (2) the polarization mode dispersion D is given by the following equation $$D = (\tau_{xo} - \tau_{yo}) + \frac{P}{c}(\sigma_x - \sigma_y) \quad (9)$$

In equation (9), the first term on the righthand side represents the delay time difference in the absence of the asymmetrical stress, while the second term represents the delay time difference caused by the stress and these differences are defined as $D_g$ and $D_s$ respectively. In the case of an optical fiber having an elliptical core, $D_g$ is given by $$D_g = \frac{n_1}{c} \Delta^2 \epsilon F(v) \quad (10)$$

where $n_1$ represents the refractive index and F(V) a function determined by a normalized frequency V and the ellipticity $\epsilon$. The polarization mode dispersion caused by stress can be calculated experimentally.

For example, where $\Delta = 0.6\%$, $\epsilon = 0.4$, $V = 0.9V_c$ (where $V_c$ shows the cut off frequency of an optical fiber having an elliptical core), since $F(V) = 0.16$ $$D_g = 11 \, (ps/km) \quad (11)$$

Since $B_s = 3.1 \times 10^{-5}$ $$D_s = B_s/c = 103 \, (ps/km) \quad (12)$$

Accordingly, the polarization mode dispersion is given by $$D = D_g + D_s = 114 \, (ps/km) \quad (13)$$

The polarization mode dispersion of a single-polarization optical fiber applied with asymmetrical stress in the direction of the x axis by a pair of fan shaped stress applying parts (see Hosaka et al "Single-polarization optical fiber having asymmetrical refractive index pits" (OQE81-22, P. 43-48, 1981) is measured as follows. In this case, it is assumed that the core is made of $GeO_2-SiO_2$, the stress applying parts are made of $B_2O_3$—$SiO_2$ and the clad is made of $SiO_2$, that the core has a relative refractive index difference $\Delta=0.61\%$, an ellipticity $\epsilon=0.07$, that the specific refractive index difference of the stress applying members $\Delta_s=-0.44\%$, and the outer diameter of the clad $2d=160$ microns.

As will be described later with reference to the accompanying drawings, a single polarization optical fiber having a large modal birefringence B which was manufactured for the purpose of stabilizing the polarization characteristic against external disturbance has a large polarization mode dispersion.

In such an optical fiber, where a slight mode coupling exists between two polarization modes a large polarization mode dispersion results thus greatly degrading the propagation characteristic in a coherent optical transmission system or the like.

SUMMARY OF THE INVENTION

Accordingly, it is a principal object of this invention to provide a single-polarization single-mode optical fiber having a polarization mode dispersion of zero.

According to this invention, there is provided a single-polarization single-mode optical fiber of the type comprising an elliptical core, a pair of stress applying parts on both sides of the minor radius of the elliptical core for applying asymmetrical stress thereto and a clad embedding therein the core and the stress applying parts, the stress applying part being made of $B_2O_3$, characterized in that a relative refractive index difference $\Delta$ between the core and the clad satisfies a relation $0.004 \leq \Delta \leq 0.05$, an ellipticity $\epsilon$ defined by an equation $\epsilon = 1 - b/a$ satisfies a relation $0.01 \leq \epsilon \leq 0.9$ where a represents a major radius of the ellipse and b a minor radius thereof, the $B_2O_3$ constituting the stress applying parts has a molar concentration of 1 to 25 mole%, ratio of thicknesses of the stress applying members and the core is 5 to 15, a modal birefringence B expressed by an equation $B=(\beta_x-\beta_y)/k$ satisfies a relation $B \geq 1 \times 10^{-6}$ where $\beta_x-\beta_y$ represents a propagation constant difference between a $HE_{11}{}^x$ mode and a $HE_{11}{}^y$ mode, and k a wave number in vacuum, whereby a polarization divergence, that is a delay time difference between the $HE_{11}{}^x$ mode and the $HE_{11}{}^y$ mode which are orthogonal with each other is zero.

DESCRIPTION OF THE PREFERRED EMBODIMENT

Figures 1, 2:
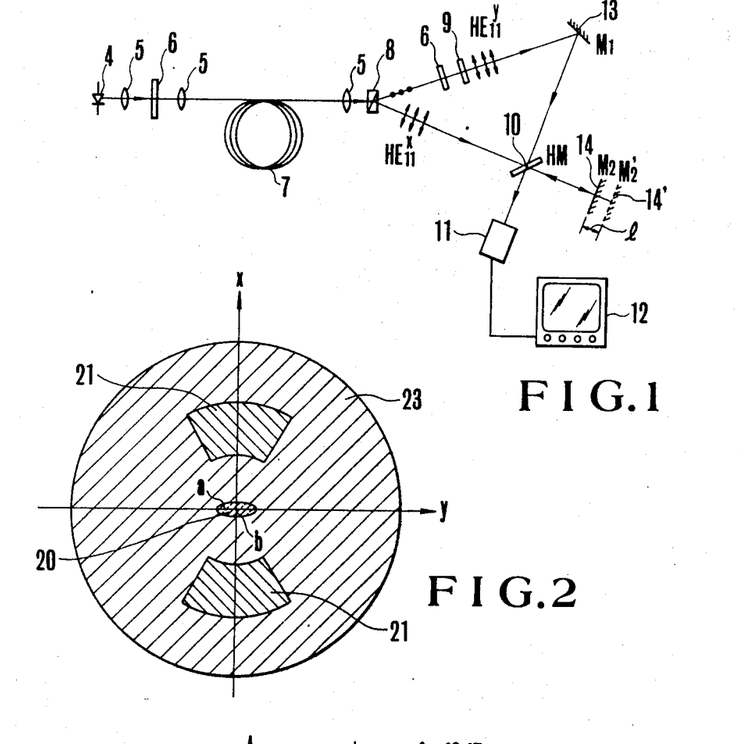
FIG. 1 is a diagrammatic representation of a measuring system for measuring the polarization mode dispersion.
FIG. 2 is a sectional view showing a preferred embodiment of the optical fiber according to this invention.

Before describing the invention, the reason why the prior art single polarization optical fiber has asymmetrical stress applying parts will be described first. The polarization mode dispersion of such optical fiber is measured by a system as shown in FIG. 1 which comprises a semiconductor laser 4 ($\lambda = 1.29$ microns), lenses 5, a $\lambda/2$ plate 6, a single-polarization optical fiber 7, a Walaston prism 8, a filter 9, a half mirror 10, a PbS detector 11, a monitor 12, a stationary mirror (M1) 13, and a movable mirror (M2) 14. The principle of measurement is as follows. Let us denote the intensities of lights in $HE_{11}{}^x$ mode and $HE_{11}{}^y$ mode on the surface of the detector 11 by $I_1$ and $I_2$ respectively, and the difference in the delay times between these two modes by $\Delta\tau = DL$ (where L represents the length of the optical fibers). Then the total intensity I is represented by the following equation.

$$I = I_1 + I_2 + 2\sqrt{I_1 I_2}|\gamma(\Delta\tau)|\cos\phi(\Delta\tau)\cdot\cos\Omega \quad (14)$$

where $\gamma$, $\phi$ and $\Omega$ respectively represent complex degree of coherence, its phase angle and, an angle between two polarized lights on the surface of the detector. By adjusting the $\lambda/2$ plate 6 it is possible to make $\Omega = 0$, that is $\cos \Omega = 1$. On the other hand, the visibility V of the interference fringes is defined as follows.

$$V = \frac{I_{max} - I_{min}}{I_{max} + I_{min}} = \frac{2\sqrt{I_1 + I_2}}{I_1 + I_2} |\gamma(\Delta\tau)| \quad (15)$$

When $I_1$ is made to be equal to $I_2$ by adjusting the light intensity with the filter 9.

$$V = |\gamma(\Delta\tau)| \quad (16)$$

Figure 3:
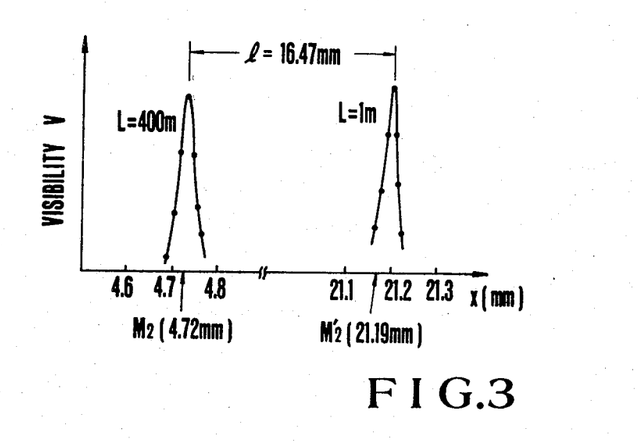
FIG. 3 is a graph showing the visibility of the interference fringes when the length of the optical fiber is equal to 1 m and 400 m respectively.

It is known that the complex degree of coherence becomes $|\gamma(0)| = 1$ when the delay time difference $\Delta\tau = 0$. Consequently, when $\Delta\tau = 0$, $V = 1$ and the clearness of the interference fringes becomes a maximum. In FIG. 1, the M2 14 is positioned at a position where the clearness becomes the maximum when the length of the optical fiber is L, and M2' 14' represents a position at which the visibility is the maximum when the length of the optical fiber is equal to 1 mm. When the length of the optical fiber is 1 m, the polarization mode dispersion can be deemed zero, M2' represents a position at which both arms of the interferometer have the same length. With the fiber length of L, the $HE_{11}{}^y$ mode reaches the end face of the fiber at a time earlier than the $HE_{11}{}^x$ mode by $\Delta\tau = (\tau_x - \tau_y)L$. Consequently, by making the length of the front side arm to be shorter by $C\Delta\tau$, the visibility becomes the maximum. Denoting the amount of movement of the mirror by l, a relation $C\Delta\tau = 2l$ holds. Accordingly, the polarization mode dispersion D is given by $$D = \tau_x - \tau_y = \frac{\Delta\tau}{L} = \frac{2l}{CL} \quad (17)$$

the result of measurement of a single-polarization optical fiber having a pair of stress applying parts on both sides of the central core is shown in FIG. 3. The amount of movement of the mirror is $$l = 16.47 \text{ mm} (L = 400 \text{ m}) \quad (18)$$

Substituting this value of l into equation (17), the polarization mode dispersion becomes $$D = 275 \text{ (ps/km)} \quad (19)$$

Let us now describe the invention as follows. A zero polarization mode dispersion, single-polarization optical fiber of this invention basically, comprises a single mode optical fiber including an elliptical core 20, a pair of segment shaped stress applying member 21 and a clad 23, as shown in FIG. 2. The polarization mode dispersion of such optical fiber can be shown by the following equation (20) from equations (9) and (10)

$$D = \frac{1}{C} n_1 \Delta^2 \epsilon F(V) + \frac{P}{C} \cdot (\sigma_x - \sigma_y) \quad (20)$$

Thus, in order to make zero the polarization mode dispersion, the following equation must be held.

$$n_1 \Delta^2 \epsilon F(V) + P \cdot (\sigma_x - \sigma_y) = 0 \quad (21)$$

From equations (2) and (21), the modal birefringence B under these conditions is given by $$B = n_1\Delta^2\epsilon G(V) + P \cdot (\sigma_x - \sigma_y) = n_1\Delta^2\epsilon[G(V) - F(V)] \quad (22)$$

$$= n_1\Delta^2\epsilon H(V)$$

But in the case of an elliptical core $$B_g = (\beta_{xo} - \beta_{yo})/k = n_1\Delta^2\epsilon G(V) \quad (23)$$

Figure 4:
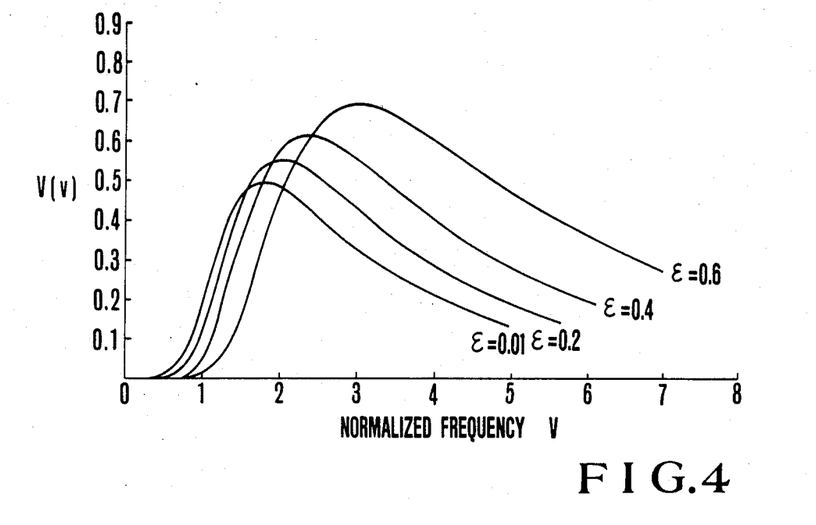
FIG. 4 is a graph showing values of G(V) that determines the geometrical birefringence of an elliptical core optical fiber.
Figure 5:
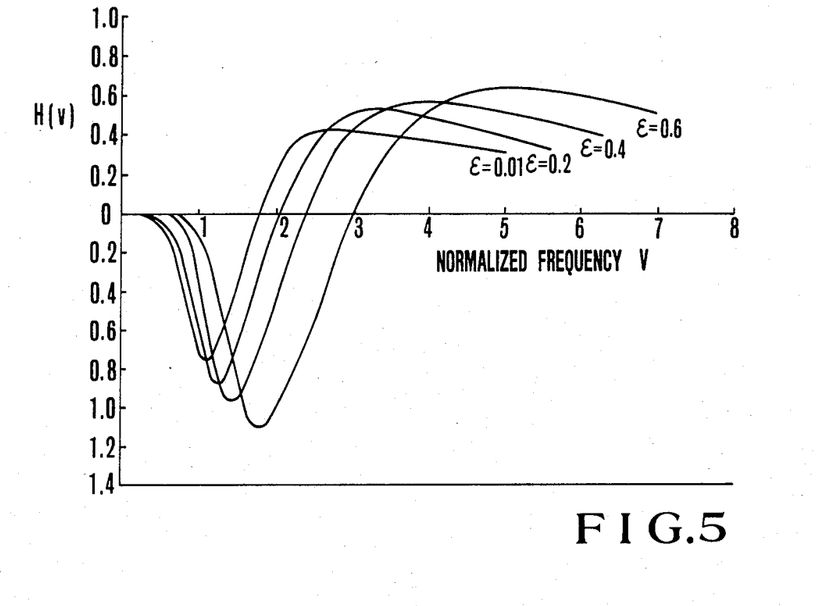
FIG. 5 is a graph showing the relation between the normalized frequency v and $$H(v)=G(V)-F(V);$$

The values of G(V) for different values of $\epsilon$ are shown in FIG. 4, and the dependency of H(V) upon the normalized frequency V is shown by FIG. 5.

In order to stabilize the polarization characteristic of a single-polarization optical fiber against external force the modal birefringence B should be larger than $1 \times 10^{-6}$.

In the following structural design, calculations are made for two cases in which $B = 1 \times 10^{-5}$ and $B = 5 \times 10^{-5}$.

Briefly stated, the design of a zero polarization divergence optical fiber is performed according to the following procedures.

(1) Determine a combination of a relative refractive index difference $\Delta$, an ellipticity $\epsilon$, and a normalized frequency V such that $B = n_1\Delta^2\epsilon H(V) = 1 \times 10^{-5}$ or $5 \times 10^{-5}$. At the same time, the value of $n_1\Delta^2\epsilon F(v)$ is also determined.

(2) Determine a stress applying member such that $$(\sigma_x - \sigma_y) = -n_1\Delta^2\epsilon F(v)/P.$$

Figure 6:
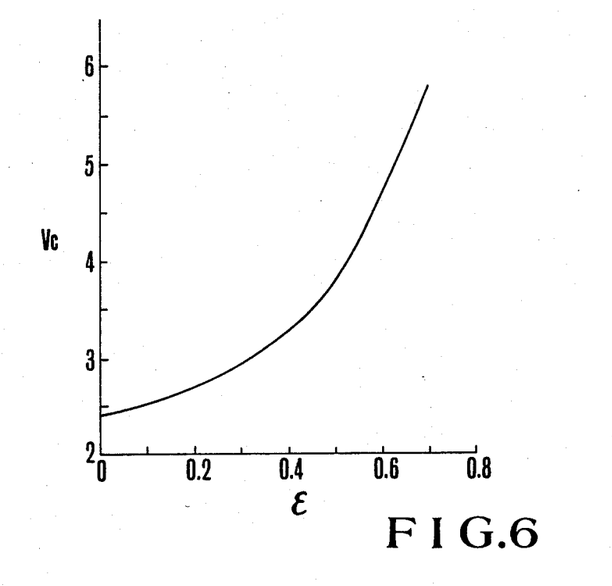
FIG. 6 is a graph showing the relation between the ellipticity $\epsilon$ and the cut-off normalized frequency $V_c$ of the elliptical core optical fiber.

Before proceeding an actual design, it is necessary to known the cut-off frequency $V_c$ of the elliptical core optical fiber. FIG. 6 shows the relation between the ellipticity and the cut-off frequency $V_c$. The cut-off wavelength $\lambda_c$ is given by $$\lambda_c = \frac{2\pi}{V_c} n_1 a \sqrt{2\Delta} \quad (24)$$

From equation (21) and equation $$V = (2\pi/\lambda)n_1 a\sqrt{2\Delta},$$

we obtain $$\lambda_c/\lambda = V/V_c \quad (25)$$

For this reason, in the discussion of the characteristic of a single mode optical fiber it is convenient to use the ratio $V/V_c$ as a parameter.

Figure 7:
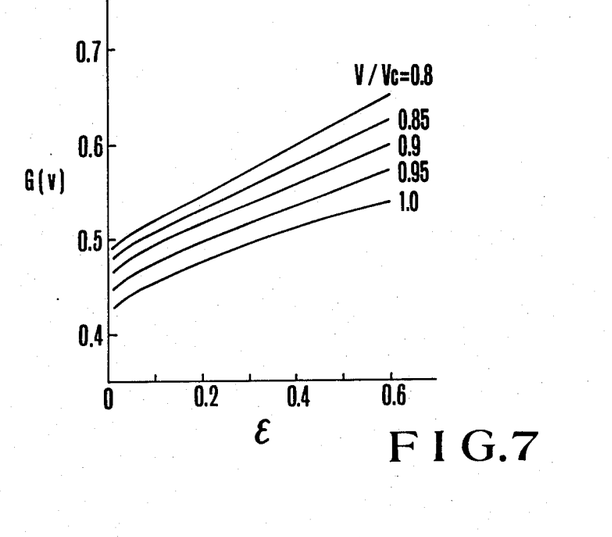
FIG. 7 is a graph showing the relation between the ellipticity $\epsilon$ and a function G(V) that determines the geometrical birefringence of the elliptical core optical fiber.
Figure 8:
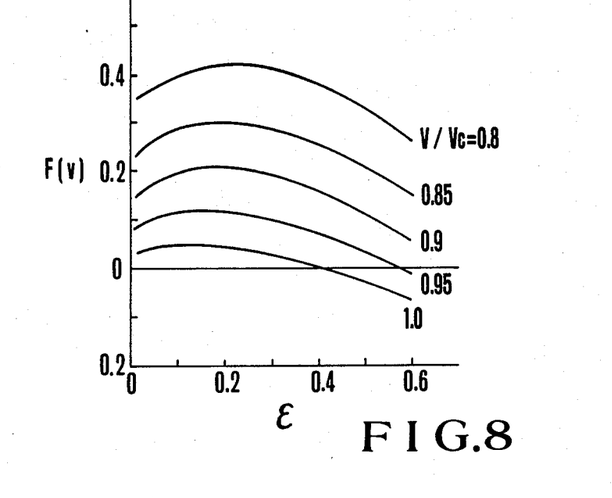
FIG. 8 is a graph showing the relation between the ellipticity $\epsilon$ and a function F(V) that determines the polarization mode dispersion characteristic of the elliptical core optical fiber.
Figure 9:
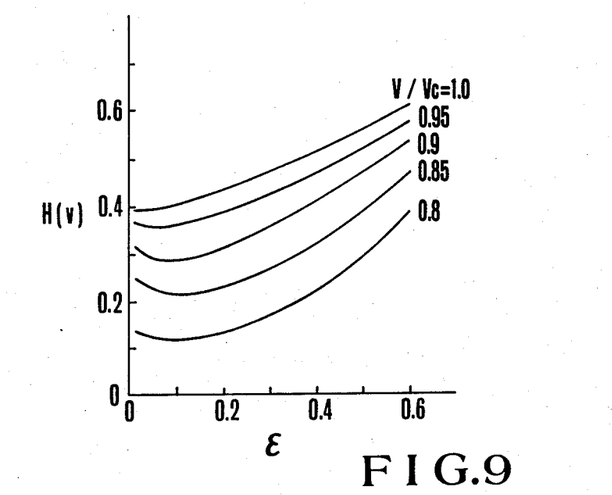
FIG. 9 is a graph showing the relation between the ellipticity $\epsilon$ and the function H(V) shown in FIG. 5.

FIGS. 7, 8 and 9 are graphs showing the relation among the ellipticity $\epsilon$ and G(V), F(V) and H(V) by utilizing the ratio $V/V_c$ as a parameter.

Hereinafter, a case wherein $B = n_1\Delta^2\epsilon = 1 \times 10^{-5}$ is called case I, and a case wherein $B = n_1\Delta^2\epsilon H(V) = 5 \times 10^{-5}$ is called case II.

Figure 10:
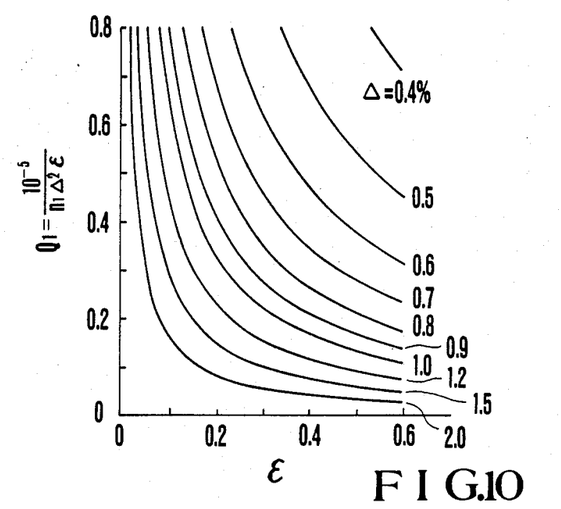
FIG. 10 is a graph showing the relation between the ellipticity $\epsilon$ and $Q_1 = 10^{-5}/n_1\Delta^2\epsilon$.
Figure 11:
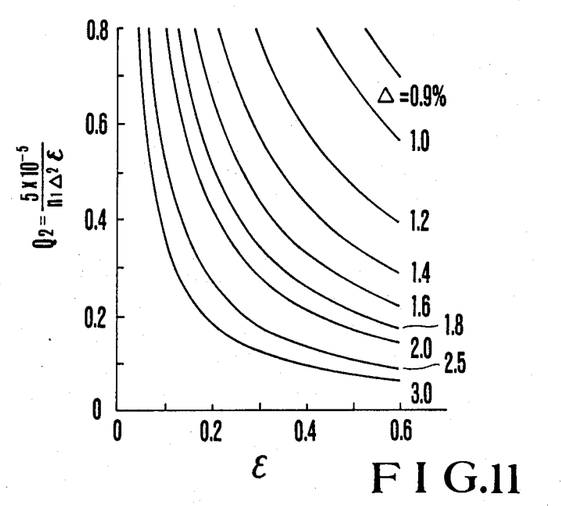
FIG. 11 is a graph showing the relation between the ellipticity $\epsilon$ and $Q_2 = 5 \times 10^{-5}/n_1\Delta^2\epsilon$.

Accordingly, it is necessary to determine a combination of $\Delta$, $\epsilon$ and V that satisfies an equation $$H(v) = \frac{1 \times 10^{-5}}{n_1\Delta^2\epsilon} = Q_1 \quad (26)$$

in the case of I, while satisfies an equation $$H(v) = \frac{5 \times 10^{-5}}{n_1\Delta^2\epsilon} = Q_2 \quad (27)$$

in the case of case II, $Q_1$ and $Q_2$ are functions of only the relative refractive index difference $\Delta$ and the ellipticity $\epsilon$, respectively. The relationships between $Q_1$ and the ellipticity $\epsilon$ and between $Q_2$ and the ellipticity $\epsilon$ are depicted in FIGS. 6 and 7 respectively with $\Delta$ as a parameter. Consequently a combination of $\epsilon$, $\Delta$ by a cross point (case I) of H(V) in FIG. 9 and $Q_1$ in FIG. 10 when these two figures are superposed one upon the other, or by a cross point (case II) of H(V) in FIG. 9 and $Q_2$ in FIG. 11 when these two figures are superposed one upon the other.

Figure 12:
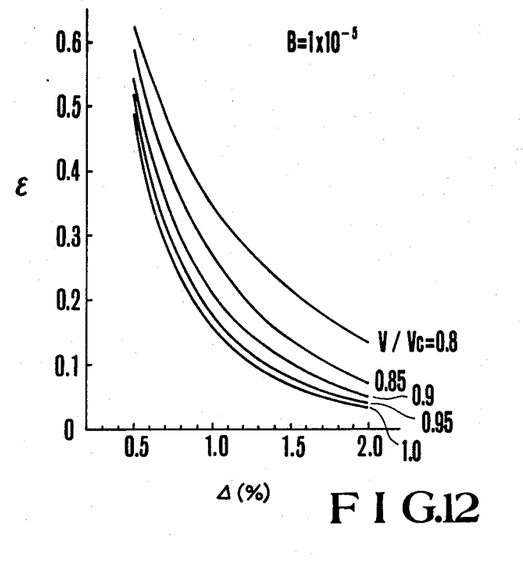
FIG. 12 is a graph showing waveguide parameters that satisfies an equation $H(V) = 1 \times 10^{-5}/n_1\Delta^2\epsilon$.

The relations thus obtained among $\Delta$, $\epsilon$ and V are depicted in FIGS. 12 (case I) and 13 (case II) with $V/V_c$ as a parameter. As can be noted from FIGS. 12 and 13, when $B=1\times 10^{-5}$ (case I) $\Delta$ should be larger than 0.3%, whereas when $B\times 10^{-5}$ (case II), $\Delta$ should be larger than 1%.

It can also be noted that the ellipticity $\epsilon$ becomes smaller as the relative refractive index difference $\Delta$ increases.

Figure 13:
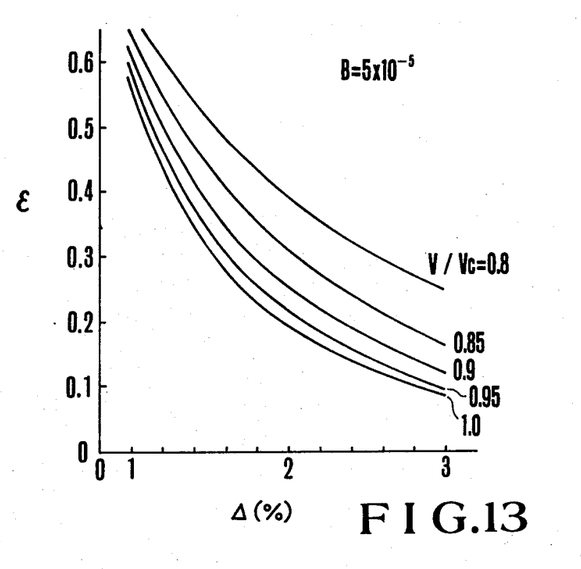
FIG. 13 is a graph showing waveguide parameters that satisfies an equation $H(V) = 5 \times 10^{-5}/n_1\Delta^2\epsilon$.

Then by using FIGS. 12 and 13 a practical design of the waveguide structure parameter is made. In the following design it is assumed that $V/V_c=0.95$ and the wavelength $\lambda=1.3$ microns. Then from equation (25) the cut-off frequency becomes $\lambda_c=1.235$ microns. When the relation between the relative rfractive index difference $\Delta$ and the core major radius a and the ellipticity $\epsilon$ are determined from the curves $V/V_c=0.95$ shown in FIGS. 12 and 13, graphs shown in FIGS. 14 (case I) and FIG. 15 (case II) are obtained.

By the above described design regarding the waveguide parameter, such waveguide parameter as the relative refractive index difference $\Delta$, the core diameter a and the ellipticity $\epsilon$ which are necessary to realize a zero polarization divergence are determined. Then, from FIG. 8 F(v) is also given.

Then it is necessary to determine the stress applying parts to satisfy an equation $$\sigma_x - \sigma_y = \frac{1}{P} n_1 \Delta^2 \epsilon F(V) \tag{28}$$

FIG. 8 shows that F(v) is positive except a case in which $V/V_c=1.0$.

Accordingly, from equation (28), it can be noted that the stress difference in the core should satisfy a relation $$\sigma_x - \sigma_y < 0 \tag{29}$$

Figure 16:
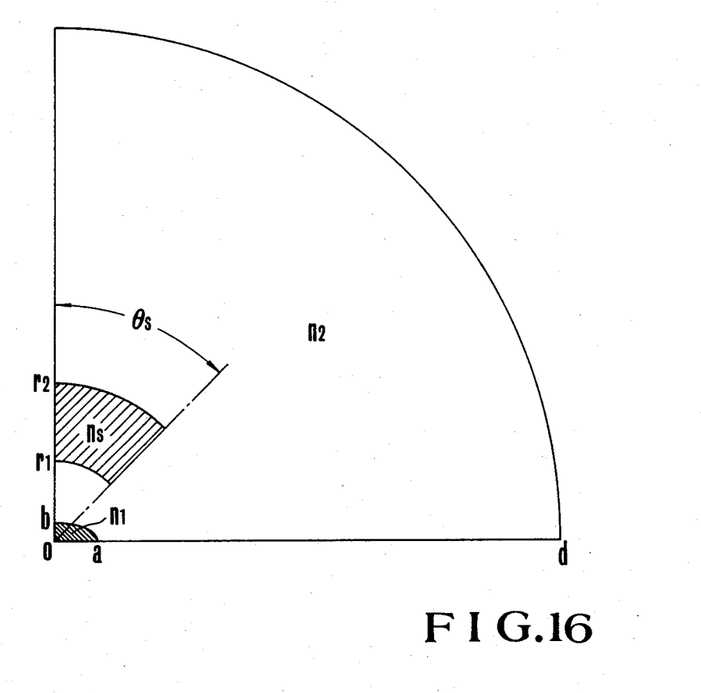
FIG. 16 is a partial sectional view of the optical fiber according to this invention.

In the absence of the stress applying parts, the stress difference in the core of an elliptical core optical fiber should satisfy a relation of $(\sigma_x-\sigma_y)<0$. Accordingly, as shown in FIG. 16, the stress applying parts should lie in the direction of Y axis. In FIG. 16 $n_s$ represents the refractive index of the stress applying part, $\gamma_1$ and $\gamma_2$ the inner radius and outer radius thereof, $\theta_s$ an angle measured from the Y axis. In this case, the outer diameter of the optical fiber is 2d=125 microns. Before designing the stress applying member it is necessary to investigate the stress difference in the core when the refractive index (molar percentage) of the stress applying parts while the diameter of the elliptical core, the relative refractive index difference and the ellipticity are fixed, provided that $B_2O_3$ is used as a dopant for the stress applying parts.

Figure 17:
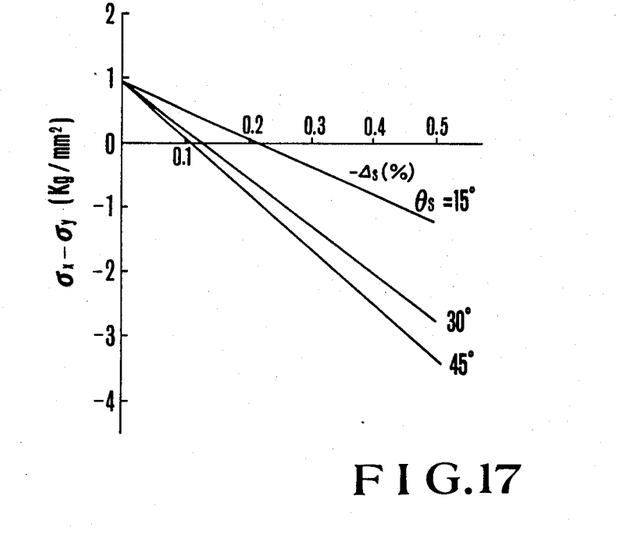
FIG. 17 is a graph showing the relation between the stress difference $\sigma_x - \sigma_y$ of the core and the relative refractive index difference $\Delta_s$ (molar percentage) of the stress applying parts.
Figure 18:
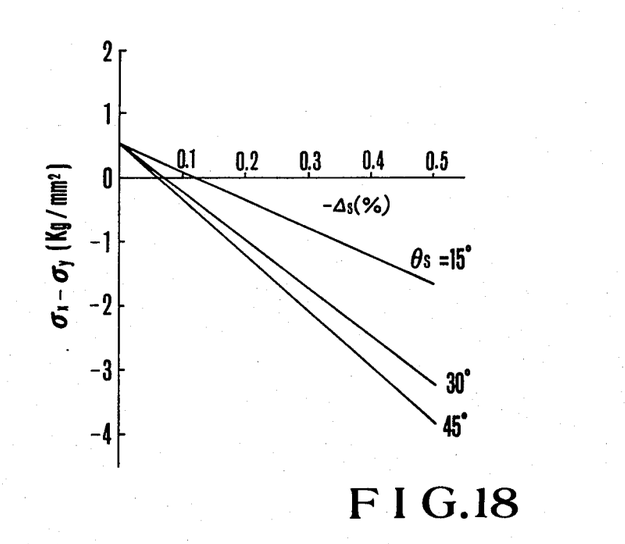
FIG. 18 is a graph showing another relation between the stress difference $(\sigma_x - \sigma_y)$ of the core and the relative refractive index difference $\Delta_s$ (molar percentage) of the stress applying parts.

FIGS. 17 and 18 show the relation between the specific refractive index $-\Delta_s$ and the stress difference $(\sigma_x-\sigma_y)$ of the stress applying parts where $\Delta=0.5\%$, $\epsilon=0.52$, a=5.2 micron and where $\Delta=1.0\%$, $\epsilon=0.18$ and a=2.5 microns respectively. Where $\Delta_a$ is given by $$\Delta_s = \frac{n_2^2 - n_1^2}{2n_2^2} \tag{30}$$

Analysis was made by using a finite element method when $\gamma_1=5b$, $\gamma_2=10b$ (where b represents the core minor axis). As can be noted from FIGS. 17 and 18 in the absence of the stress applying parts $\sigma_x-\sigma_y<0$, but as the refractive index difference (molar percentage) $-\Delta_s$ of the stress applying part increase $\sigma_x-\sigma_y<0$. Furthermore it can be noted that $\sigma_x-\sigma_y$ is proportional to $\Delta_s$.

Figure 19:
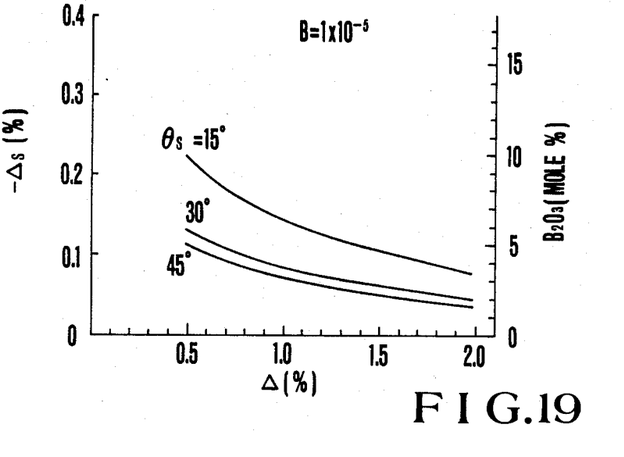
FIGS. 19 and 20 are graphs showing two examples of the graph showing stress applying structure for realizing the relation between the relative refractive index difference $\Delta_s$ of the stress applying parts and the relative refractive index difference $\Delta$, in which are $B = 1 \times 10^{-5}$ and $B = 5 \times 10^{-5}$.
Figure 20:
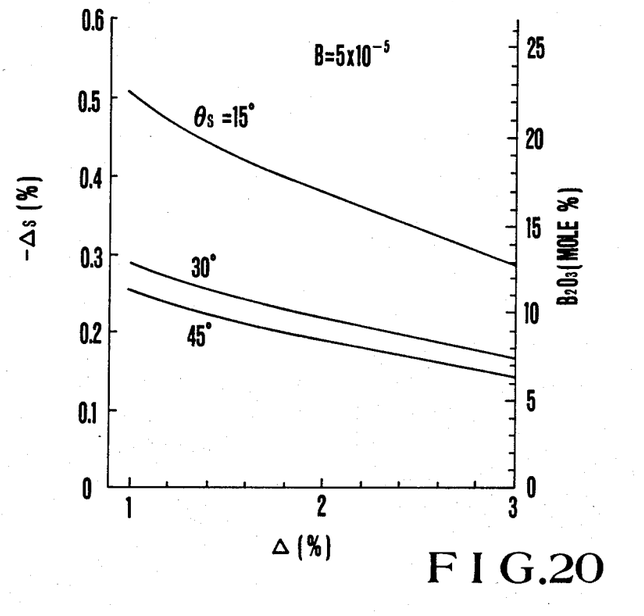

The relative refractive index difference (molar percentage) of the stress applying parts that satisfies the relation shown by equation (28) was calculated based on these results and the results of calculation are shown by the graphs in FIGS. 19 (case I) and 20 (case II).

Figure 14:
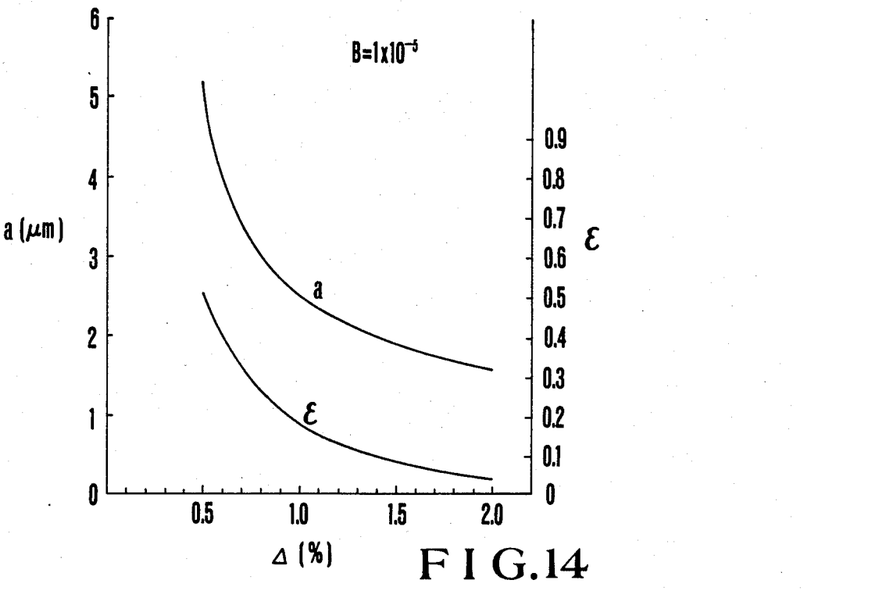
FIG. 14 is a graph showing waveguide parameters that realize the single-polarization single mode optical fiber of this invention where the modal birefringence $B = 1 \times 10^{-5}$.
Figure 15:
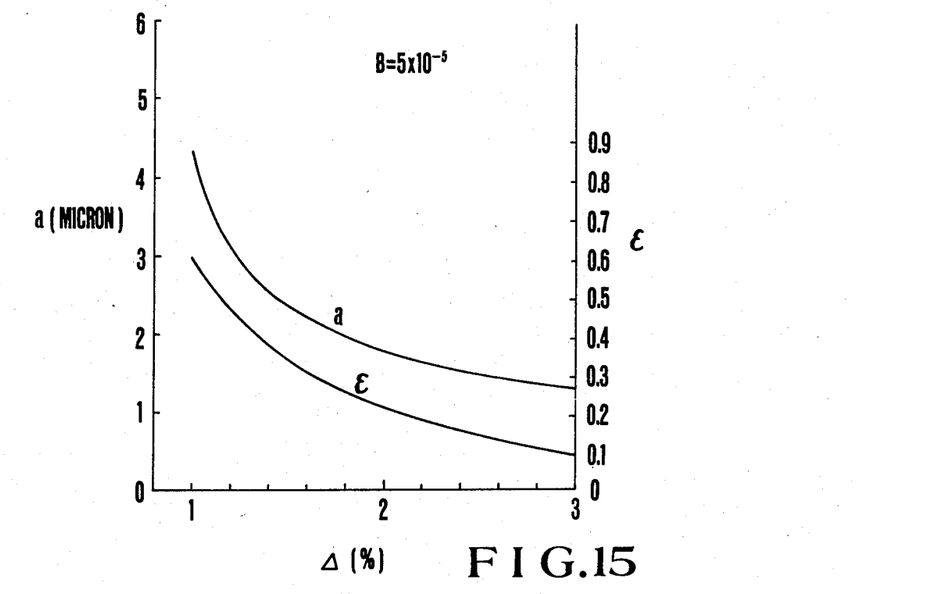
FIG. 15 is a graph showing waveguide parameters that realize the single-polarization single-mode optical fiber of this invention wherein modal birefringence $B = 5 \times 10^{-5}$.

Summarizing the above a single-polarization single-mode optical fiber can be realized by using waveguide parameters shown in FIGS. 13 and 14 and an elliptic core optical fiber having a stress applying construction as shown in FIGS. 19 and 20.

As can be apparent from the foregoing description, the single-polarization single-mode optical fiber according to this invention, can make zero the polarization mode dispersion without impairing the polarization preserving characteristic of the single-mode optical fiber so that it has a large merit in such applications as a coherent optical transmission system, a measuring system utilizing an optical fiber, a coupling system with an integrated circuit type optical circuit.

In this embodiment, the specific refractive index difference of the core was $\Delta 38\%$. This relation was selected by taking into consideration the fact that the Rayleigh scattering loss increases as the dopant concentration of the core increases, but where the optical fiber is used in such applications where the loss of the fiber does not cause any significant trouble, for example, a fiber sensor or the like, about 5% of the specific refractive index difference is permissible. Even in such a case, it is possible to realize the single-polarization single-mode optical fiber according to the design shown in the embodiment.

With regard to the absorption loss caused by the dopant in the stress applying member, for the purpose of avoiding increase in the loss caused by the absorption of infrared lights by $B_2O_3$—$SiO_2$ constituting the stress applying part, in this embodiment the stress applying parts were separated from the core by a distance more than five times of the minor radius of the core, as above described in a case wherein increase in the loss is permissible, the stress applying parts may be positioned more closely to the core. On the other hand, even when the stress applying part is spaced from the core by a distance about 15 times of the minor radius of the core, it is possible to realize a zero polarization divergence by increasing the concentration of the dopant in the stress applying parts.

Where such material as $TiO_2$ which decreases the thermal expansion coefficient is used as the dopant for the stress applying parts, the stress applying parts are disposed in the direction of x axis instead of y axis as shown in the embodiment.

In the foregoing embodiment, the ellipticity of the core was selected to satisfy a relation $0.1\leq\epsilon\leq 0.6$, where increase in the connection loss does not present any serious problem $\epsilon$ may be increase to about 0.9.

What is claimed is:

1. A single-polarization single-mode optical fiber of the type comprising an elliptical core, a pair of stress applying parts on both sides of minor radius of said elliptical core for applying asymmetrical stress thereto and a clad embedding therein said core and said stress applying parts, said stress applying parts being made of $B_2O_3$—$SiO_2$ characterized in that a relative refractive index difference $\Delta$ between the core and the clad satisfies a relation $0.004 \leqq \Delta \leqq 0.05$, an ellipticity $\epsilon$ defined by an equation $\epsilon = 1 - b/a$ satisfies a relation $0.01 \leqq \epsilon \leqq 0.9$ where a represents a major radius of the ellipse and b a minor radius thereof, said $B_2O_3$ constituting said stress applying parts has a molar concentration of 1 to 25 mole %, ratio of thicknesses of said stress applying parts and said core is 5 to 15, a modal birefringence B expressed by an equation $B = (\beta_x - \beta_y)/k$ satisfies a relation $B \geqq 1 \times 10^{31}\ 6$ where $(\beta_x - \beta_y)$ represents a propagation constant difference between a $HE_{11}^x$ mode and a $HE_{11}^y$ mode, and k a wave number in vacuum, wherein a delay time difference between the $HE_{11}^x$ mode and the $HE_{11}^y$ mode which are orthogonal with each other is zero.

2. The optical fiber according to claim 1 wherein said clad is made of $SiO_2$.

* * * * *

UNITED STATES PATENT AND TRADEMARK OFFICE
CERTIFICATE OF CORRECTION

PATENT NO. : 4,480,897

DATED : November 6, 1984

INVENTOR(S) : Katsunari Okamoto, et al

It is certified that error appears in the above-identified patent and that said Letters Patent is hereby corrected as shown below:

Figure 4 of the drawings should be deleted to appear as per the attached Figure 4.

Signed and Sealed this

Twenty-third Day of April 1985

[SEAL]

Attest:

DONALD J. QUIGG

Attesting Officer

Acting Commissioner of Patents and Trademarks

FIG. 4